United States Patent
Yamamoto et al.

(10) Patent No.: US 11,525,412 B2
(45) Date of Patent: Dec. 13, 2022

(54) OPERATION MANAGEMENT DEVICE, POWER GENERATION PLANT, AND OPERATION MANAGEMENT METHOD FOR POWER GENERATION PLANT

(71) Applicants: MITSUBISHI HEAVY INDUSTRIES, LTD., Tokyo (JP); Mitsubishi Hitachi Power Systems, Ltd., Yokohama (JP)

(72) Inventors: Keisuke Yamamoto, Tokyo (JP); Shintaro Kumano, Tokyo (JP); Makoto Kishi, Tokyo (JP); Katsuhiko Abe, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 464 days.

(21) Appl. No.: 16/495,642

(22) PCT Filed: Mar. 27, 2018

(86) PCT No.: PCT/JP2018/012495
§ 371 (c)(1),
(2) Date: Sep. 19, 2019

(87) PCT Pub. No.: WO2018/181355
PCT Pub. Date: Oct. 4, 2018

(65) Prior Publication Data
US 2020/0109671 A1 Apr. 9, 2020

(30) Foreign Application Priority Data
Mar. 29, 2017 (JP) .............................. JP2017-065896

(51) Int. Cl.
*F02D 35/00* (2006.01)
*F02D 28/00* (2006.01)
(Continued)

(52) U.S. Cl.
CPC ............ *F02D 35/0007* (2013.01); *F02C 9/28* (2013.01); *F02D 28/00* (2013.01); *F02D 29/06* (2013.01);
(Continued)

(58) Field of Classification Search
CPC ...... F02D 35/0007; F02D 28/00; F02D 29/06; F02C 9/28; F02C 9/00; G05B 13/048;
(Continued)

(56) References Cited

U.S. PATENT DOCUMENTS 6,226,974 B1 * 5/2001 Andrew .................... F02C 9/28
60/772
6,539,783 B1 4/2003 Adibhatla
(Continued)

FOREIGN PATENT DOCUMENTS

| JP | 2007-077866 A | 3/2007 |
|---|---|---|
| JP | 2011-226651 A | 11/2011 |
| JP | 2012-112330 A | 6/2012 |

OTHER PUBLICATIONS

International Search Report dated Jun. 19, 2018, issued in counterpart Application No. PCT/JP2018/012495, with English translation (3 pages).
(Continued)

Primary Examiner — Kurt Philip Liethen
(74) Attorney, Agent, or Firm — WHDA, LLP

(57) ABSTRACT

An operation management device includes a state acquiring unit that acquires a measurement value of a first state amount indicating an operation state of a power generation plant, a state updating unit that updates an estimation value of a second state amount, which indicates the operation state of the power generation plant and is a state amount different from the first state amount, based on the measurement value of the first state amount, and a managing unit that manages
(Continued)

the operation state of the power generation plant based on the estimation value of the second state amount.

11 Claims, 12 Drawing Sheets

(51) Int. Cl.
  *F02D 29/06* (2006.01)
  *F02C 9/28* (2006.01)
  *G05B 13/04* (2006.01)
(52) U.S. Cl.
  CPC ........ *G05B 13/048* (2013.01); *F05D 2260/81* (2013.01); *F05D 2270/71* (2013.01)
(58) Field of Classification Search
  CPC . G05B 23/02; F05D 2260/81; F05D 2270/71; F05D 2260/80; F05D 2270/303; F01D 25/00
  See application file for complete search history.

(56) References Cited

U.S. PATENT DOCUMENTS

| | | | |
|---|---|---|---|
| 8,452,515 B2 | 5/2013 | Drohan et al. | |
| 8,639,480 B2 | 1/2014 | Arnold et al. | |
| 9,043,118 B2 | 5/2015 | Healy | |
| 9,850,823 B2* | 12/2017 | Miduturi | F02C 9/28 |
| 2011/0231081 A1* | 9/2011 | Suzuki | F02D 13/0261 701/104 |
| 2012/0036861 A1* | 2/2012 | Seely | F02C 9/28 60/776 |
| 2013/0024179 A1* | 1/2013 | Mazzaro | F01D 17/20 703/18 |
| 2013/0025254 A1 | 1/2013 | Kurosaka et al. | |
| 2013/0253898 A1* | 9/2013 | Meagher | G06N 20/00 703/18 |
| 2013/0261938 A1* | 10/2013 | Ogata | F02D 41/3035 701/105 |
| 2014/0090353 A1* | 4/2014 | Simons | F02C 9/16 60/39.5 |
| 2014/0121935 A1* | 5/2014 | Zhang | F02C 9/00 701/100 |
| 2014/0257666 A1* | 9/2014 | Abrol | F02C 9/48 701/100 |

OTHER PUBLICATIONS

Written Opinion dated Jun. 19, 2018, issued in counterpart Application No. PCT/JP2018/012495, with English Translation. (11 pages).

* cited by examiner

OPERATION MANAGEMENT DEVICE, POWER GENERATION PLANT, AND OPERATION MANAGEMENT METHOD FOR POWER GENERATION PLANT

TECHNICAL FIELD

The present invention relates to an operation management device, a power generation plant, and an operation management method for a power generation plant.

Priority is claimed on Japanese Patent Application No. 2017-065896, filed on Mar. 29, 2017, the content of which is incorporated herein by reference.

BACKGROUND ART

When a facility of a power generation plant is operated for a long period of time, the efficiency of configuration elements configuring the facility reduces. In order to estimate a secular change of each of the configuration elements, a method of correcting control parameters of the facility according to the efficiency of the facility and a change in operation conditions and automatically adjusting a mathematical model representing the facility is under consideration.

For example, a method of generating a model correction coefficient through a Kalman filter with the use of a difference between a gas turbine model and an operation parameter and automatically adjusting a mathematical model is disclosed in PTL 1.

CITATION LIST

Patent Literature

[PTL 1] U.S. Pat. No. 8,639,480

DISCLOSURE OF INVENTION

Technical Problem

Herein, the reliability of a measurement value of the operation parameter is not high in some cases due to a cause such as an error of a measurement instrument and a measurement delay. In a case where the method disclosed in PTL 1 is used, there is a possibility that control parameters cannot be appropriately adjusted when a measurement value with low reliability is used. Although using a difference between a predicted value of the mathematical model and a measurement value of the operation parameter is described in PTL 1, a specific method of using the measurement value in the mathematical model is not disclosed.

The present invention is devised in view of the problems above, and an object thereof is to provide an operation management device, a power generation plant, and an operation management method for a power generation plant, which allow appropriately managing an operation state of a facility.

Solution to Problem

According to a first aspect of the present invention, there is provided an operation management device including a state acquiring unit that acquires a measurement value of a first state amount indicating an operation state of a power generation plant, a state updating unit that updates an estimation value of a second state amount, which indicates the operation state of the power generation plant and is a state amount different from the first state amount, based on the measurement value of the first state amount, and a managing unit that manages the operation state of the power generation plant based on the estimation value of the second state amount.

According to a second aspect of the present invention, in the operation management device according to the first aspect, the second state amount may be a state amount of which a measurement value obtained by measurement has reliability lower than reliability of the measurement value of the first state amount.

According to a third aspect of the present invention, in the operation management device according to the first or second aspect, a control amount adjusting unit that adjusts a control amount for controlling the operation state of the power generation plant based on the estimation value of the second state amount may be further included. The managing unit may manage operation of the power generation plant based on the control amount.

According to a fourth aspect of the present invention, in the operation management device according to any one of the first to third aspects, an actual performance acquiring unit that acquires an actual value of the first state amount and an actual value of the second state amount, which are related to past operation of the power generation plant, a change amount calculating unit that calculates a first change amount which is a difference between the actual value of the first state amount and the measurement value of the first state amount, and a change amount estimating unit that estimates a second change amount which is a change amount from the actual value of the second state amount related to the past operation of the power generation plant based on the first change amount may be further included. The state estimating unit may update the estimation value of the second state amount based on the second change amount and the actual value of the second state amount.

According to a fifth aspect of the present invention, in the operation management device according to any one of the first to fourth aspects, the state acquiring unit may further acquire a measurement value of the second state amount, and the managing unit may manage the operation state of the power generation plant based on the measurement value of the second state amount.

According to a sixth aspect of the present invention, in the operation management device according to any one of the first to fifth aspects, a measurement evaluating unit that evaluates a measurement value of the second state amount based on the estimation value of the second state amount may be further included. The managing unit may manage the operation state of the power generation plant based on an evaluation result of the measurement value.

According to a seventh aspect of the present invention, in the operation management device according to the sixth aspect, the measurement evaluating unit may evaluate the measurement value of the second state amount by calculating an error value which is a difference between the estimation value of the second state amount and the measurement value of the second state amount, and the managing unit may manage the operation state of the power generation plant based on the error value of the second state amount.

According to an eighth aspect of the present invention, in the operation management device according to the fourth aspect, the change amount estimating unit may estimate the second change amount based on any one of a relational expression between the first change amount and the second change amount, a table showing a correspondence relationship between the first change amount and the second change amount, and any input value.

According to a ninth aspect of the present invention, in the operation management device according to any one of the first to eighth aspects, the first state amount may include an exhaust air temperature, and the second state amount may include intake air flow rate.

According to a tenth aspect of the present invention, in the operation management device according to any one of the first to ninth aspects, the control amount adjusting unit may adjust a control amount for controlling the operation state of the power generation plant based on an estimation value of a third state amount which is a state amount different from the first state amount and the second state amount indicating the operation state of the power generation plant.

According to an eleventh aspect of the present invention, in the operation management device according to any one of the first to tenth aspects, the first state amount may include a combustion temperature.

According to a twelfth aspect of the present invention, there is provided a power generation plant that includes the operation management device according to any one of the first to eleventh aspects.

According to a thirteenth aspect of the present invention, there is provided an operation management method for a power generation plant including acquiring a measurement value of a first state amount indicating an operation state of the power generation plant, updating an estimation value of a second state amount, which indicates the operation state of the power generation plant and is a state amount different from the first state amount, based on the measurement value of the first state amount, and managing the operation state of the power generation plant based on the estimation value of the second state amount.

Advantageous Effects of Invention

According to at least one of the aspects, the operation management device can appropriately manage the operation state of the facility.

BEST MODE FOR CARRYING OUT THE INVENTION

First Embodiment

Hereinafter, a first embodiment will be described in detail with reference to the drawings.

Figure 1:
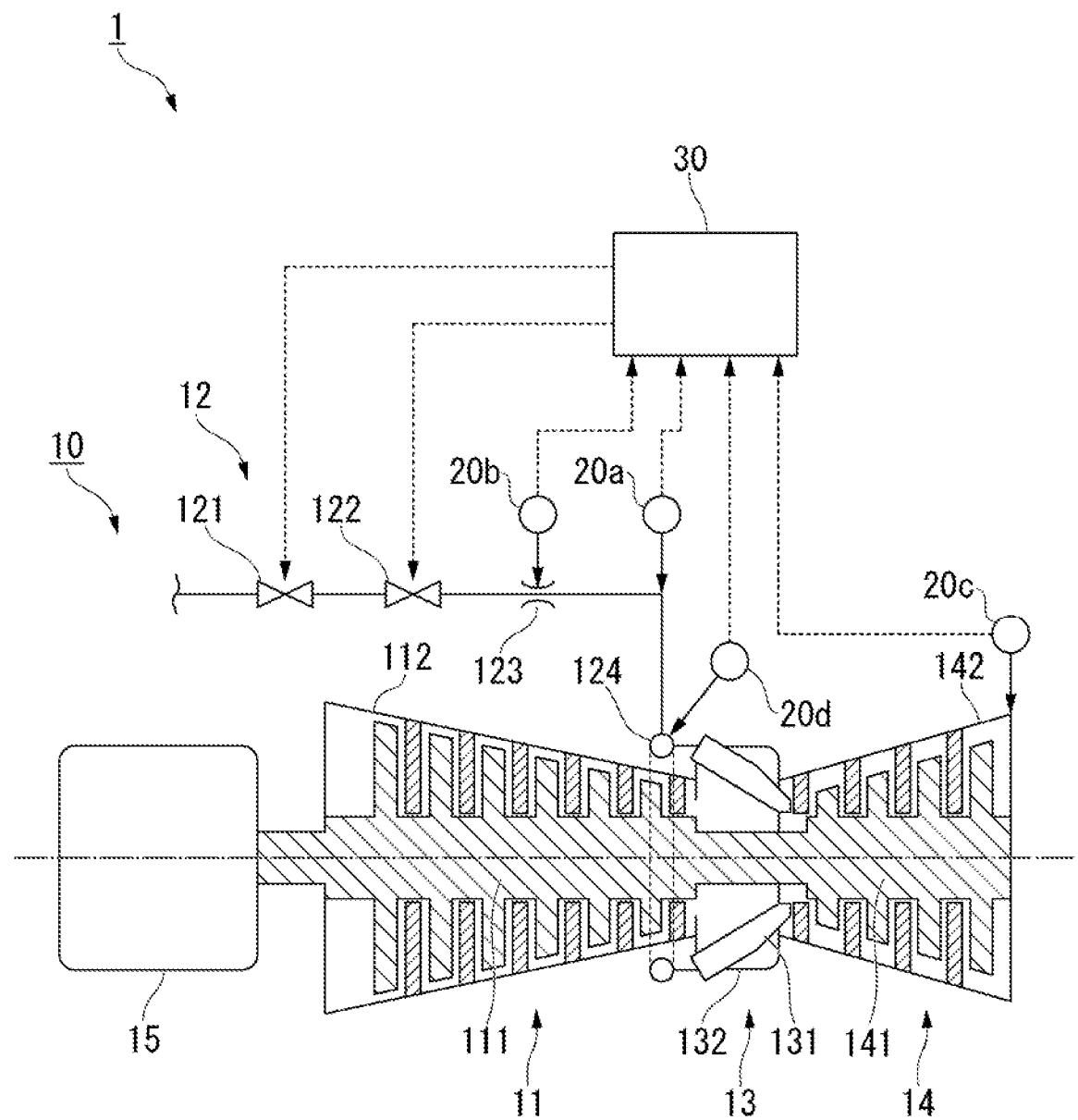
FIG. 1 is a schematic view illustrating a configuration of a power generation plant according to a first embodiment.

FIG. 1 is a schematic view illustrating a configuration of a power generation plant according to the first embodiment.

A power generation plant 1 includes a gas turbine generator 10, measurement instruments 20, and an operation management device 30.

<Configuration of Gas Turbine Generator>

The gas turbine generator 10 includes a compressor 11, a fuel system 12, a combustor 13, a turbine 14, and a generator 15.

The compressor 11 compresses external air and generates high-pressure compressed air. More specifically, the compressor 11 includes a compressor rotor 111 that rotates about a main axis and a compressor casing 112 that covers the compressor rotor 111 from an outer circumferential side. The turbine 14 includes a turbine rotor 141 that rotates about the main axis and a turbine casing 142 that covers the turbine rotor 141 from the outer circumferential side. The compressor rotor 111 and the turbine rotor 141 are integrally connected to each other on the main axis.

The combustor 13 generates a high-temperature and high-pressure combustion gas by combusting a fuel supplied from the fuel system 12, which is in the compressed air generated by the compressor 11. The combustor 13 includes a combustor inner cylinder 131 and a combustor casing 132 that covers the combustor inner cylinder 131. In addition, the compressor casing 112, the combustor casing 132, and the turbine casing 142 are connected to each other.

The generator 15 is connected to one end of the compressor rotor 111. The generator 15 is driven by the rotation of the compressor rotor 111 and generates power.

The fuel system 12 adjusts a pressure and flow rate of a fuel supplied from a fuel tank. The fuel system 12 includes a pressure adjusting valve 121, a fuel flow rate adjusting valve 122, a nozzle 123, and a manifold 124. A plurality of fuel systems 12 may be provided according to a fuel supply destination. For example, the gas turbine generator 10 may include a top hat fuel system that supplies a fuel to a top hat part of the combustor 13, a pilot fuel system that supplies a fuel to a central part of the inner cylinder of the combustor 13, and a main fuel system that supplies a fuel to a portion of the inner cylinder of the combustor 13, which surrounds the pilot fuel system.

The plurality of measurement instruments 20 that each measure a state amount are provided in the gas turbine generator 10. Specifically, at least a fuel flow rate sensor 20a that measures fuel flow rate of the fuel system 12, a nozzle flow rate sensor 20b that measures nozzle 123 passing flow rate (nozzle passing flow rate), an exhaust gas flow rate sensor 20c that measures exhaust gas flow rate, and a manifold pressure sensor 20d that measures a pressure in the manifold 124 (manifold pressure) are provided in the gas turbine generator 10. All of fuel flow rate, nozzle passing flow rate or fuel valve passing flow rate, exhaust gas flow rate, and a manifold pressure are state amounts of the gas turbine generator 10. Hereinafter, the state amounts measured by the measurement instruments 20 will be also referred to as a first state amount.

<Configuration of Operation Management Device>

Figure 2:
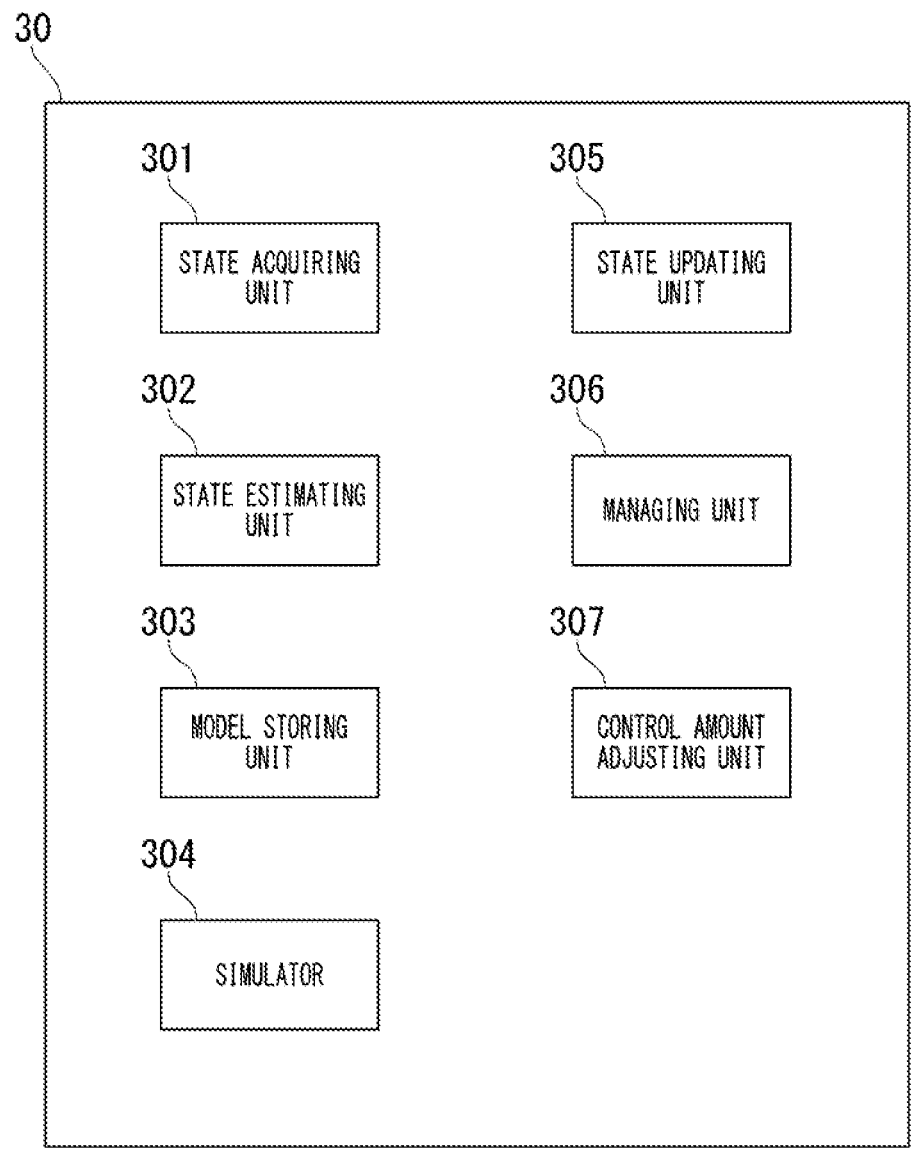
FIG. 2 is a schematic diagram showing a configuration of an operation management device according to the first embodiment.

FIG. 2 is a schematic diagram showing a configuration of the operation management device according to the first embodiment.

The operation management device 30 manages the operation of the gas turbine generator 10 based on measurement values measured by the plurality of measurement instruments 20 provided in the gas turbine generator 10.

The operation management device 30 includes a state acquiring unit 301, a state estimating unit 302, a model storing unit 303, a simulator 304, a state updating unit 305, a managing unit 306, and a control amount adjusting unit 307.

The state acquiring unit 301 acquires a measurement value of a state amount (first state amount) from the measurement instruments 20. That is, the state acquiring unit 301 acquires at least fuel flow rate, nozzle passing flow rate, exhaust gas flow rate, or a manifold pressure from the measurement instruments 20.

The state estimating unit 302 estimates intake air flow rate and an internal pressure of the combustor casing 132 (casing pressure) based on the measurement value acquired by the state acquiring unit 301. Hereinafter, as intake air flow rate and a casing pressure, a state amount estimated by the state estimating unit 302 will also be referred to as a second state amount.

The model storing unit 303 stores a prediction model for predicting overall behavior of the power generation plant 1.

The simulator 304 calculates the behavior of the power generation plant 1 based on the prediction model stored by the model storing unit 303 and a value of a state amount of the gas turbine generator 10.

The state updating unit 305 updates a value of a state amount held by the simulator 304 with the measurement value of the first state amount acquired by the state acquiring unit 301 and an estimation value of the second state amount.

The managing unit 306 manages the operation of the power generation plant 1 based on calculation results from the simulator 304.

The control amount adjusting unit 307 adjusts a control amount of the power generation plant 1 based on the calculation results from the simulator 304. Examples of the control amount include an opening degree of an inlet guide vane (IGV), an opening degree of the pressure adjusting valve 121, and an opening degree of the fuel flow rate adjusting valve 122.

<State Amount>

In a case of measuring with the use of the measurement instruments, the second state amount estimated by the operation management device 30 is a state amount of which a measurement value does not have sufficient reliability in terms of the operation management of the power generation plant 1. For example, although intake air flow rate can be measured based on a differential pressure between an upstream pressure and a downstream pressure in an intake air inlet portion, the differential pressure is extremely small even when compared to the upstream pressure and the downstream pressure in the intake air inlet portion, and greatly receives an effect of noise included in measurement values of the upstream pressure and the downstream pressure in the intake air inlet portion. For this reason, a ratio of a signal to noise of intake air flow rate, which is calculated based on the differential pressure, is small, and does not have high reliability. In addition, a casing pressure has a long delay of measurement by the measurement instruments (a time constant is large), and does not have high reliability.

On the contrary, the first state amount measured by the measurement instruments 20 is a state amount of which a measurement value has higher reliability than the second state amount. In other words, in a case of measuring each of the first state amount and the second state amount with the use of a measurement instrument having the same degree of accuracy, the reliability of the measurement value of the first state amount is higher than the reliability of the measurement value of the second state amount. For example, a ratio of a signal to noise of a measurement value related to exhaust gas flow rate and fuel flow rate is larger than a ratio of a signal to noise of a measurement value in a case of measuring intake air flow rate. In addition, a time constant of a measurement value related to nozzle passing flow rate and a manifold pressure is smaller than a time constant of a measurement value in a case of measuring casing pressure.

<Action of Operation Management Device>

Figure 3:
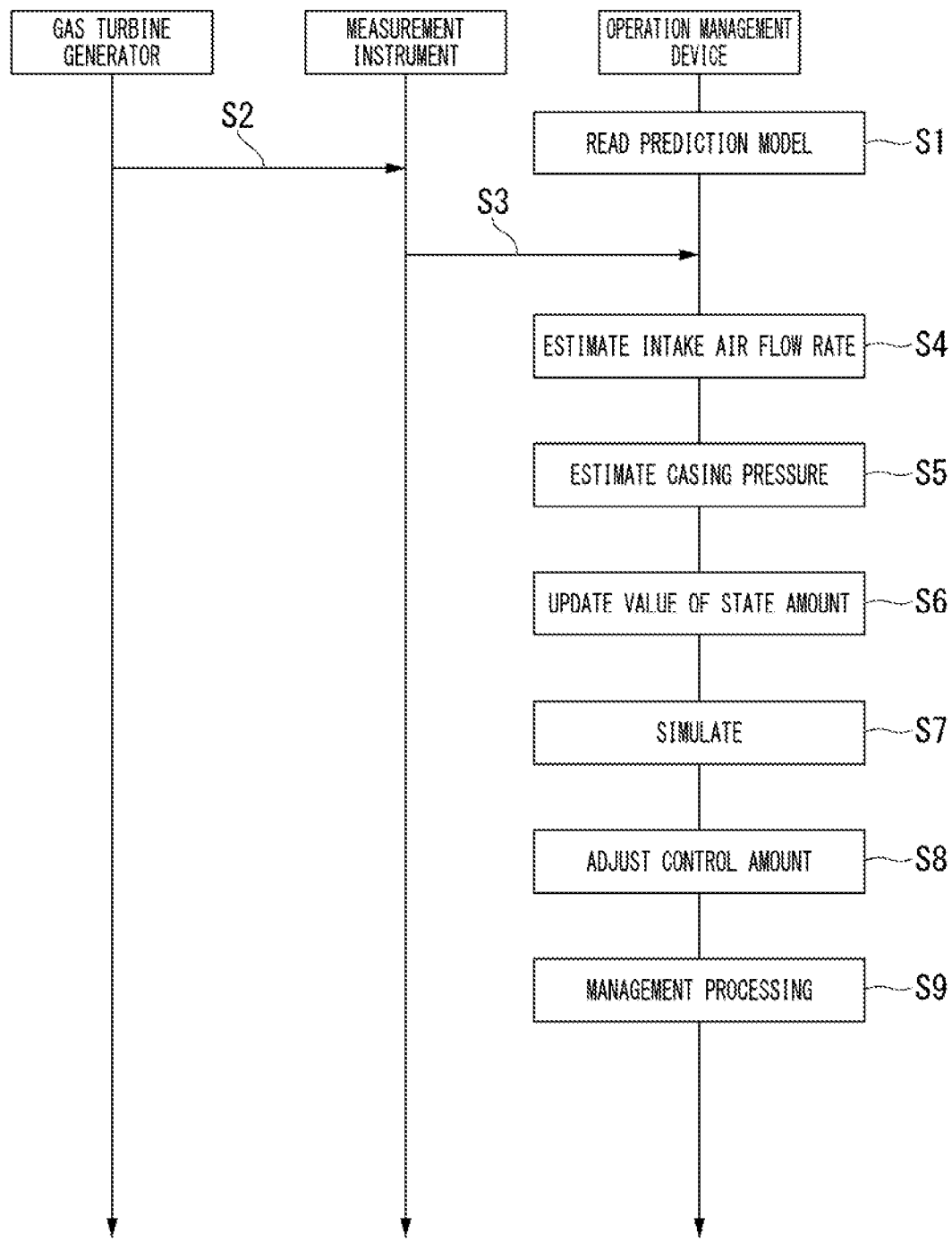
FIG. 3 is a sequence diagram showing action of the power generation plant according to the first embodiment.

FIG. 3 is a sequence diagram showing action of the power generation plant according to the first embodiment.

When the operation management device 30 starts managing the power generation plant 1, the simulator 304 reads the prediction model from the model storing unit 303 (Step S1). In addition, each of the measurement instruments 20 measures the first state amount of the gas turbine generator 10 (Step S2).

Next, the state acquiring unit 301 acquires fuel flow rate, nozzle passing flow rate, exhaust gas flow rate, or a manifold pressure from each of the measurement instruments 20 provided in the gas turbine generator 10 (Step S3).

Next, the state estimating unit 302 estimates intake air flow rate based on the fuel flow rate and the exhaust gas flow rate acquired by the state acquiring unit 301 (Step S4). Specifically, the state estimating unit 302 estimates intake air flow rate by subtracting the fuel flow rate from the exhaust gas flow rate.

In addition, the state estimating unit 302 estimates a casing pressure based on the fuel flow rate, the nozzle passing flow rate, and the manifold pressure which are acquired by the state acquiring unit 301 (Step S5). Specifically, the state estimating unit 302 estimates a casing pressure based on Equation (1) below. In other embodiments, the state estimating unit 302 may estimate only one of intake air flow rate and a casing pressure (executes only one of Steps S4 and S5).

[Equation 1]

$$G = CdA \sqrt{2g \frac{\kappa}{\kappa-1} P_0 \gamma_0 \left[ \left(\frac{P_1}{P_0}\right)^{\frac{2}{\kappa}} - \left(\frac{P_1}{P_0}\right)^{\frac{\kappa+1}{\kappa}} \right]} \times 100000 \quad (1)$$

In Equation (1), G indicates fuel flow rate, Cd indicates a coefficient according to nozzle passing flow rate, A indicates a diameter area of the nozzle 123, g indicates gravity acceleration, $\kappa$ indicates a specific heat ratio, $P_0$ indicates a manifold pressure, $P_1$ indicates a casing pressure, and $\gamma_0$ indicates gas density. The gas density $\gamma_0$ is acquired by a function of the manifold pressure $P_0$. Equation (1) is an example of a relational expression between a first change amount and a second change amount.

Equation (1) is an equation of fuel flow rate at the time of unchoking. Therefore, in a case where the gas turbine generator 10 is in an unchoked state, the state estimating unit 302 estimates a casing pressure based on Equation (1). On the other hand, an equation of fuel flow rate at the time of choking is as shown in Equation (2).

[Equation 2]

$$G = CdA\sqrt{\kappa g\left(\frac{2}{\kappa+1}\right)^{\frac{\kappa+1}{\kappa-1}} P_0 \gamma_0 \times 10000} \qquad (2)$$

As shown with Equation (2), the equation of fuel flow rate at the time of choking is not a function of a casing pressure. Therefore, in a case where the gas turbine generator 10 is an unchoked state, the state estimating unit 302 cannot obtain an estimation value of a casing pressure. In this case, a casing pressure is calculated through simulation by the simulator 304 to be described later. Whether or not the gas turbine generator 10 is in a choked state can be determined, for example, by a ratio between a manifold pressure and a casing pressure. Specifically, it can be determined that the gas turbine generator is in an unchoked state in a case where a value obtained by dividing a manifold pressure by a casing pressure is smaller than 2 and is in a choked state in a case where a value obtained by dividing a manifold pressure by a casing pressure is equal to or larger than 2. In this case, determination as to whether or not the gas turbine generator is in a choked state is performed with the use of a casing pressure which is an objective variable, but this determination is not necessary in a strict sense. Thus, the determination may be performed, for example, with the use of a measurement value of a casing pressure.

Next, the state updating unit 305 updates a value of a state amount held by the simulator 304 based on a measurement value acquired by the state acquiring unit 301 and an estimation value estimated by the state estimating unit 302 (Step S6). Then, the simulator 304 simulates the power generation plant 1 based on the prediction model and the updated value of the state amount (Step S7). At this time, the simulator 304 simulates also a value of a state amount that has not been updated by the state updating unit 305. For example, the simulator 304 simulates a combustion temperature, a turbine inlet temperature (TIT), and a combustor pressure. Hereinafter, a state amount calculated through simulation by the simulator 304 will also be referred to as a third state amount. The first state amount and the second state amount are state amounts acquired without depending on simulation.

The control amount adjusting unit 307 adjusts a control amount of the power generation plant 1 based on simulation results from the simulator 304 (Step S8). For example, the control amount adjusting unit 307 calculates an opening degree of the pressure adjusting valve 121 and an opening degree of the fuel flow rate adjusting valve 122, which are necessary in order to achieve a generation target, based on the state amounts indicated by the simulation results. Then, the managing unit 306 performs management processing of the power generation plant 1 based on the simulation results from the simulator 304 and the control amount adjusted by the control amount adjusting unit 307 (Step S9). Examples of the management processing include monitoring to determine whether or not a state amount of the power generation plant 1 has departed from an operation allowable range, monitoring to determine whether or not a generation amount of the power generation plant 1 satisfies a target, changing opening degree setting by outputting a control signal to the IGV, or outputting a control signal to the pressure adjusting valve 121 and the fuel flow rate adjusting valve 122. In addition, the control amount calculated by the control amount adjusting unit 307 is used in simulation by the simulator 304 as well. After then, the operation management device 30 brings the processing back to Step S2, and periodically updates a state amount.

As described above, in the first embodiment, the operation management device 30 updates an estimation value of the second state amount based on a measurement value of the first state amount, and manages an operation state of the power generation plant 1 based on the estimation value of the second state amount. Accordingly, the operation management device 30 can appropriately manage an operation state of a facility. In particular, in the first embodiment, in a case where measurement is performed, the second state amount is a state amount of which a measurement value has lower reliability than the reliability of a measurement value of the first state amount. That is, in the first embodiment, the reliability of a value of the second state amount can be improved than in a case of acquiring through measurement.

Second Embodiment

Figure 4:
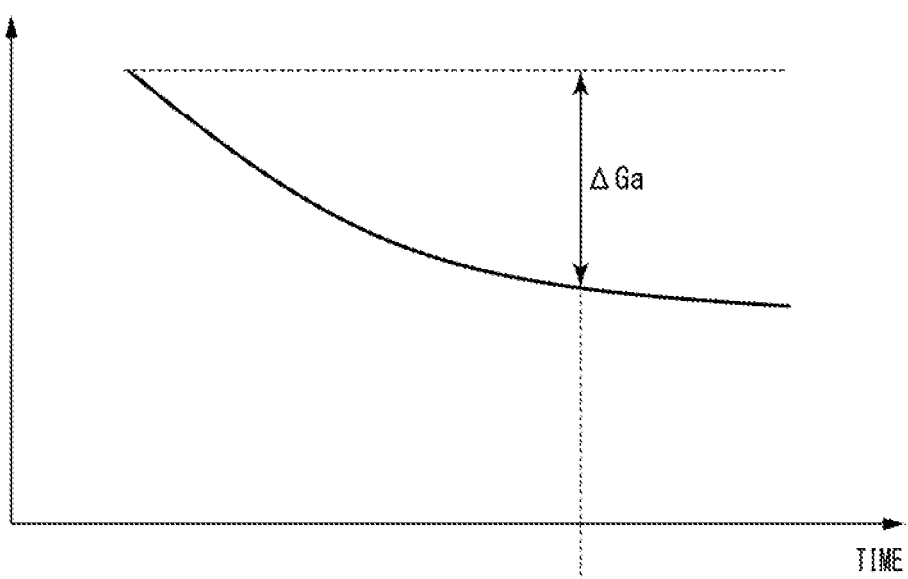
FIG. 4 is a graph showing a relationship between an exhaust gas temperature and intake air flow rate.
Figure 4:
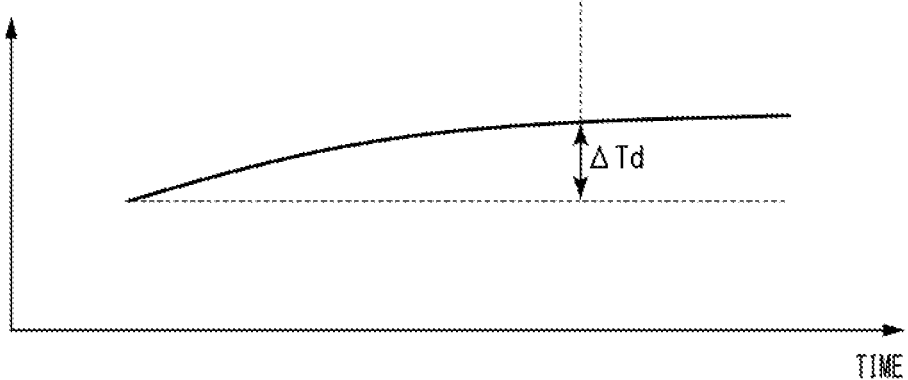

FIG. 4 is a graph showing a relationship between an exhaust gas temperature and intake air flow rate.

In a second embodiment, the operation management device 30 estimates intake air flow rate based on a measurement value of an exhaust gas temperature and a past actual value of intake air flow rate. As shown in FIG. 4, intake air flow rate of the gas turbine generator 10 decreases as operation time becomes longer due to degradation in the efficiency of the compressor 11. At this time, since air flow rate at the time of combustion decreases, the exhaust gas temperature becomes higher even when the output of the generator 15 is the same. That is, as shown in FIG. 4, the exhaust gas temperature of the gas turbine generator 10 rises as operation time becomes longer. Therefore, there is a correlation between a change amount of the exhaust gas temperature and a change amount of the intake air flow rate, and the change amount of the intake air flow rate can be acquired from the change amount of the exhaust gas temperature. That is, a change amount $\Delta Ga$ of the intake air flow rate can be expressed as a function of a change amount $\Delta Td$ of the exhaust gas temperature ($\Delta Ga = f(\Delta Td)$).

Figure 5:
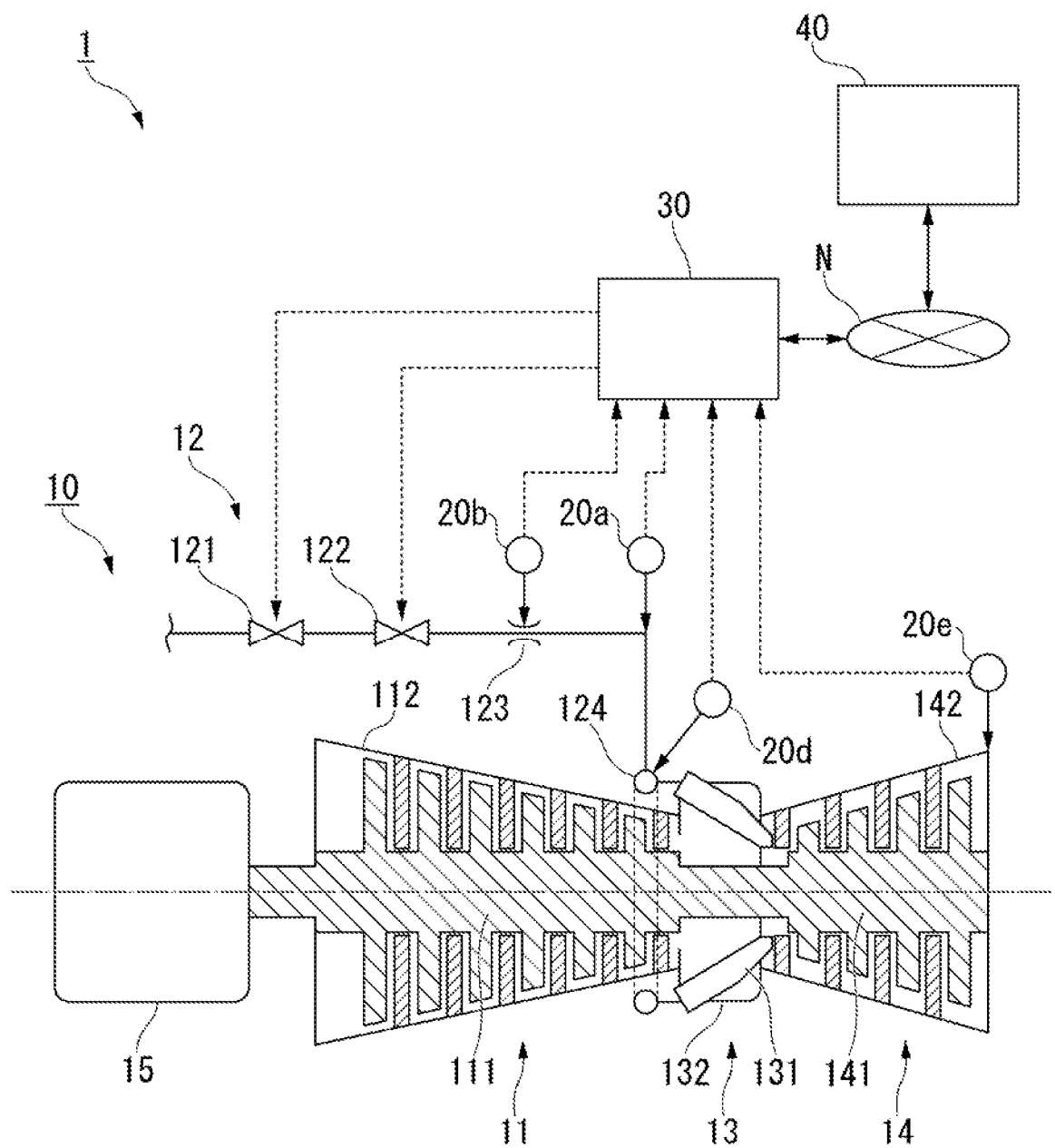
FIG. 5 is a schematic view illustrating a configuration of a power generation plant according to a second embodiment.

FIG. 5 is a schematic view illustrating a configuration of a power generation plant according to the second embodiment.

The power generation plant 1 according to the second embodiment is different from the first embodiment in terms of state amounts measured by the measurement instruments 20 and a configuration of the operation management device 30. A configuration of the gas turbine generator 10 is the same as in the first embodiment.

An exhaust gas temperature sensor 20e that measures an exhaust gas temperature is provided in the gas turbine generator 10 according to the second embodiment. An exhaust gas temperature is the first state amount. The power generation plant 1 according to the second embodiment may not necessarily include the exhaust gas flow rate sensor 20c.

<Configuration of Operation Management Device>

The operation management device 30 according to the second embodiment communicates with a server device 40 via a network N. The server device 40 stores an actual value of a state amount in the past operation of the power generation plant 1 and a relational expression used in calculation of the second state amount.

Figure 6:
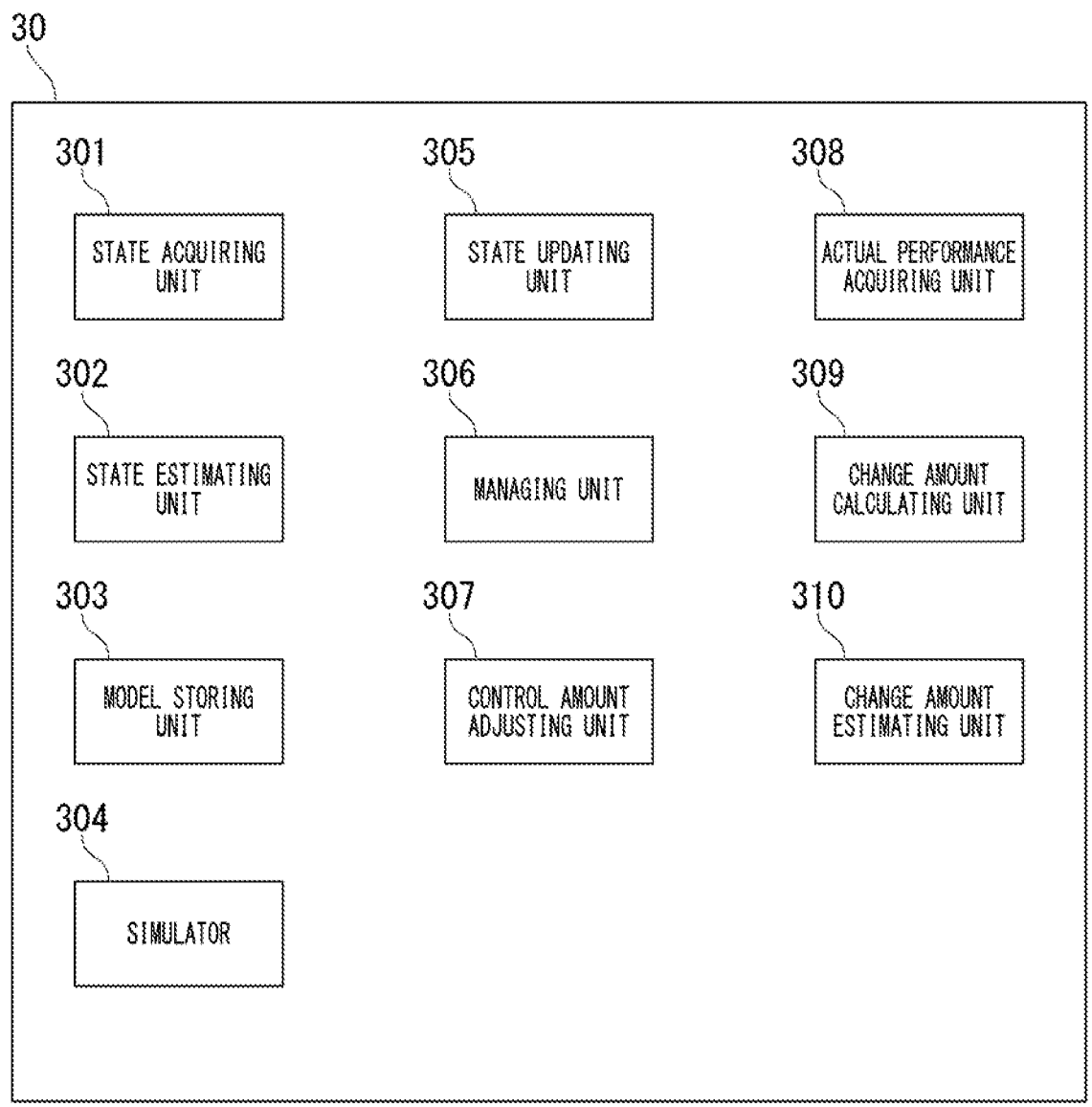
FIG. 6 is a schematic diagram showing a configuration of an operation management device according to the second embodiment.

FIG. 6 is a schematic diagram showing a configuration of the operation management device according to the second embodiment.

The operation management device 30 according to the second embodiment further includes an actual performance acquiring unit 308, a change amount calculating unit 309, and a change amount estimating unit 310 in addition to the configuration of the first embodiment.

The actual performance acquiring unit 308 acquires an actual value of a state amount related to the past operation of the power generation plant 1 from the server device 40. The actual performance acquiring unit 308 may acquire an actual value of a state amount related to the past operation of a power generation plant 101, which is different from the power generation plant 1, from the server device 40. Specifically, the actual performance acquiring unit 308 acquires an actual value of intake air flow rate (second state amount) and an actual value of an exhaust gas temperature (first state amount). The actual value may be, for example, a measurement value of a state amount measured at the time of delivery or at the time of periodic inspection of the power generation plant 1. At the time of delivery or at the time of periodic inspection, measurement of a state amount is performed with the use of a measurement instrument having higher accuracy than the measurement instruments 20 included in the power generation plant 1.

The change amount calculating unit 309 calculates a change amount of an exhaust gas temperature (first change amount), which is a difference between the actual value of the exhaust gas temperature acquired by the actual performance acquiring unit 308 and a measurement value of an exhaust gas temperature acquired by the state acquiring unit 301.

The change amount estimating unit 310 estimates a change amount of intake air flow rate (second change amount) which is caused by aging based on the change amount of the exhaust gas temperature. The change amount of the intake air flow rate is a difference between a value of intake air flow rate at the present time point and the actual value of the intake air flow rate acquired by the actual performance acquiring unit 308. The change amount estimating unit 310 receives a relational expression between an exhaust gas temperature and intake air flow rate or a table showing a correspondence relationship between an exhaust gas temperature and intake air flow rate from the server device 40, and estimates a change amount of intake air flow rate based on this. In other embodiments, the change amount estimating unit 310 may estimate a change amount of intake air flow rate based on any input value.

The state estimating unit 302 according to the second embodiment estimates a value of intake air flow rate based on the change amount of the intake air flow rate estimated by the change amount estimating unit 310 and the actual value of the intake air flow rate acquired by the actual performance acquiring unit 308.

<Action of Operation Management Device>

Figure 7:
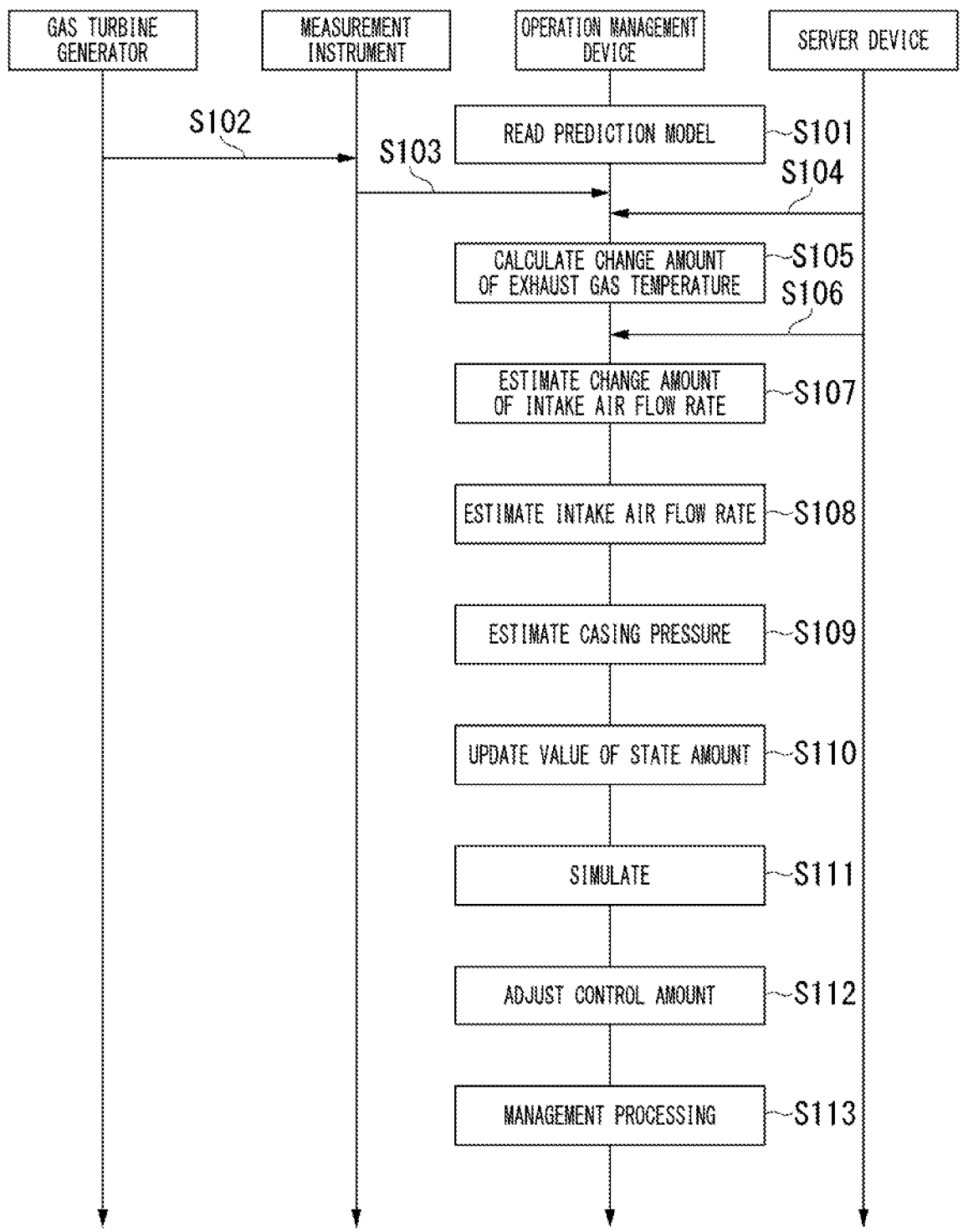
FIG. 7 is a sequence diagram showing action of the power generation plant according to the second embodiment.

FIG. 7 is a sequence diagram showing action of the power generation plant according to the second embodiment.

When the operation management device 30 starts managing the power generation plant 1, the simulator 304 reads the prediction model from the model storing unit 303 (Step S101). In addition, each of the measurement instruments 20 measures the first state amount of the gas turbine generator 10 (Step S102).

Next, the state acquiring unit 301 acquires fuel flow rate, nozzle passing flow rate, exhaust gas flow rate, or a manifold pressure from each of the measurement instruments 20 provided in the gas turbine generator 10 (Step S103).

Next, the actual performance acquiring unit 308 acquires actual values of intake air flow rate and an exhaust gas temperature from the server device 40 (Step S104). Next, the change amount calculating unit 309 calculates a change amount of an exhaust gas temperature by calculating a difference between the measurement value of the exhaust gas temperature and the actual value of the exhaust gas temperature (Step S105). Next, the change amount estimating unit 310 acquires the relational expression between an exhaust gas temperature and intake air flow rate or the table showing a correspondence relationship between an exhaust gas temperature and intake air flow rate from the server device 40 (Step S106). Next, the change amount estimating unit 310 estimates a change amount of intake air flow rate based on the acquired relational expression or the acquired table (Step S107). Next, the state estimating unit 302 estimates intake air flow rate at the present time point by adding the change amount of the intake air flow rate to the actual value of the intake air flow rate acquired by the actual performance acquiring unit 308 (Step S108).

In addition, the state estimating unit 302 estimates a casing pressure based on the fuel flow rate, the nozzle passing flow rate, and the manifold pressure, which are acquired by the state acquiring unit 301 (Step S109). A casing pressure estimating method is the same as in the first embodiment.

Next, the state updating unit 305 updates a value of a state amount held by the simulator 304 based on a measurement value acquired by the state acquiring unit 301 and an estimation value estimated by the state estimating unit 302 (Step S110). Then, the simulator 304 simulates the power generation plant 1 based on the prediction model and the updated value of the state amount (Step S111).

The control amount adjusting unit 307 adjusts a control amount of the power generation plant 1 based on the simulation results from the simulator 304 (Step S112). Next, the managing unit 306 performs management processing of the power generation plant 1 based on the simulation results from the simulator 304 and the control amount adjusted by the control amount adjusting unit 307 (Step S113). Then, the operation management device 30 brings the processing back to Step S2, and executes calculation related to the next control timing.

As described above, in the second embodiment, the operation management device 30 estimates a change amount of the second state amount (second change amount) based on a difference (first change amount) between an actual value of the first state amount related to the past operation of the power generation plant 1 and a measurement value of the first state amount, and updates an estimation value of the second state amount based on the second change amount and an actual value of the second state amount. Accordingly, the operation management device 30 can more appropriately manage an operation state of the power generation plant 1.

In addition, in the second embodiment, the operation management device 30 may estimate a change amount of the second state amount (second change amount) based on a difference (first change amount) between an actual value of the first state amount related to the past operation of the power generation plant 101, which is different from the power generation plant 1, and a measurement value of the first state amount, and update an estimation value of the second state amount based on the second change amount and an actual value of the second state amount. Accordingly, the operation management device 30 can more appropriately manage an operation state of the power generation plant 1 with the use of also an actual value of the power generation plant 101 which is the same type as the power generation plant 1 but is different from the power generation plant 1.

Although the operation management device 30 acquires a change amount of intake air flow rate based on a first change amount in the second embodiment, other embodiments are not limited thereto. For example, the operation management device 30 according to other embodiments may acquire the second state amount other than intake air flow rate based on a first change amount.

Third Embodiment

Figure 8:
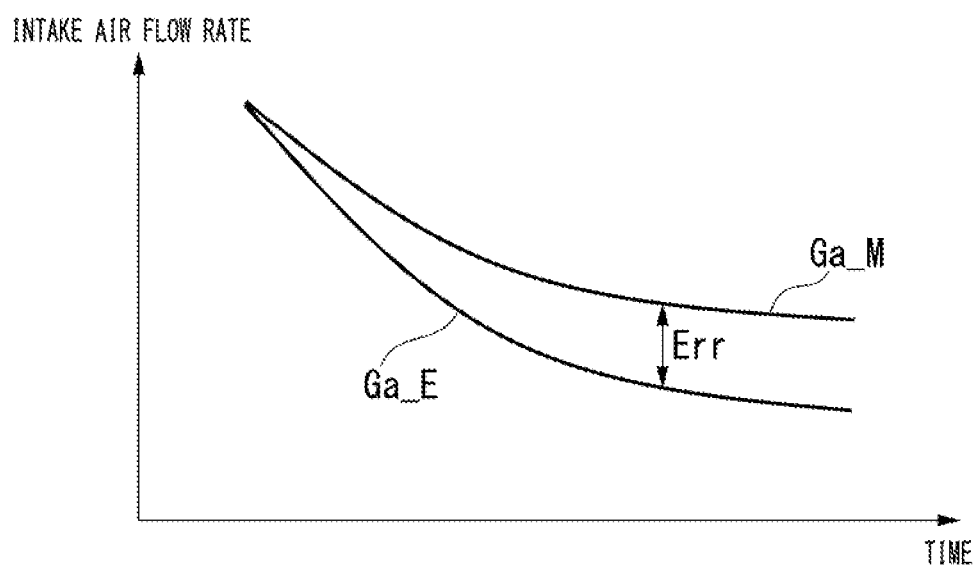
FIG. 8 is a graph showing a relationship between a measurement value and an estimation value of intake air flow rate.

FIG. 8 is a graph showing a relationship between a measurement value and an estimation value of intake air flow rate.

In a third embodiment, the operation management device 30 measures intake air flow rate with the measurement instruments 20, and evaluates the measurement value with a measurement value of intake air flow rate. Specifically, evaluation as to whether or not an error value Err, which is a difference between a measurement value Ga_M of intake air flow rate and an estimation value Ga_E of intake air flow rate is equal to or larger than a predetermined threshold is performed. In a case where the prediction model is appropriately is built, the error value Err decreases when a measurement error of intake air flow rate Ga_M is small. That is, the fact that the error value Err is small means that the reliability of the measurement value Ga_M is high. Therefore, the operation management device 30 according to the third embodiment determines, with the error value Err, which is a difference between the measurement value Ga_M and the estimation value Ga_E, which one of the measurement value Ga_M and the estimation value Ga_E is to be used in managing an operation state of the power generation plant 1.

Figure 9:
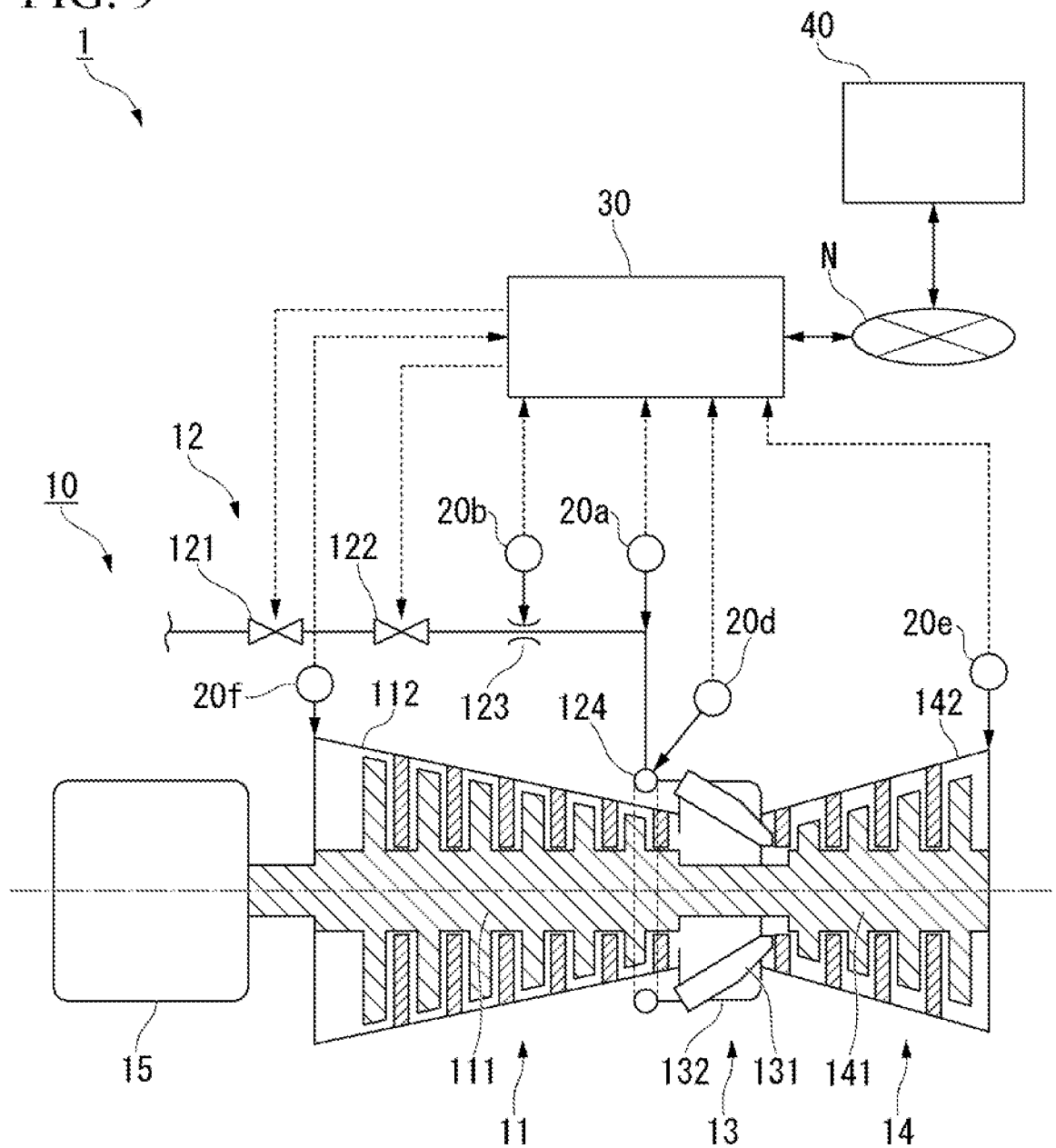
FIG. 9 is a schematic view illustrating a configuration of a power generation plant according to a third embodiment.

FIG. 9 is a schematic view illustrating a configuration of the power generation plant according to the third embodiment.

The power generation plant 1 according to the third embodiment is different from the second embodiment in terms of state amounts measured by the measurement instruments 20 and a configuration of the operation management device 30. A configuration of the gas turbine generator 10 is the same as in the first and second embodiments. An intake air flow rate sensor 20f that measures intake air flow rate of the compressor 11 is provided in the gas turbine generator 10 according to the third embodiment.

<Configuration of Operation Management Device>

Figure 10:
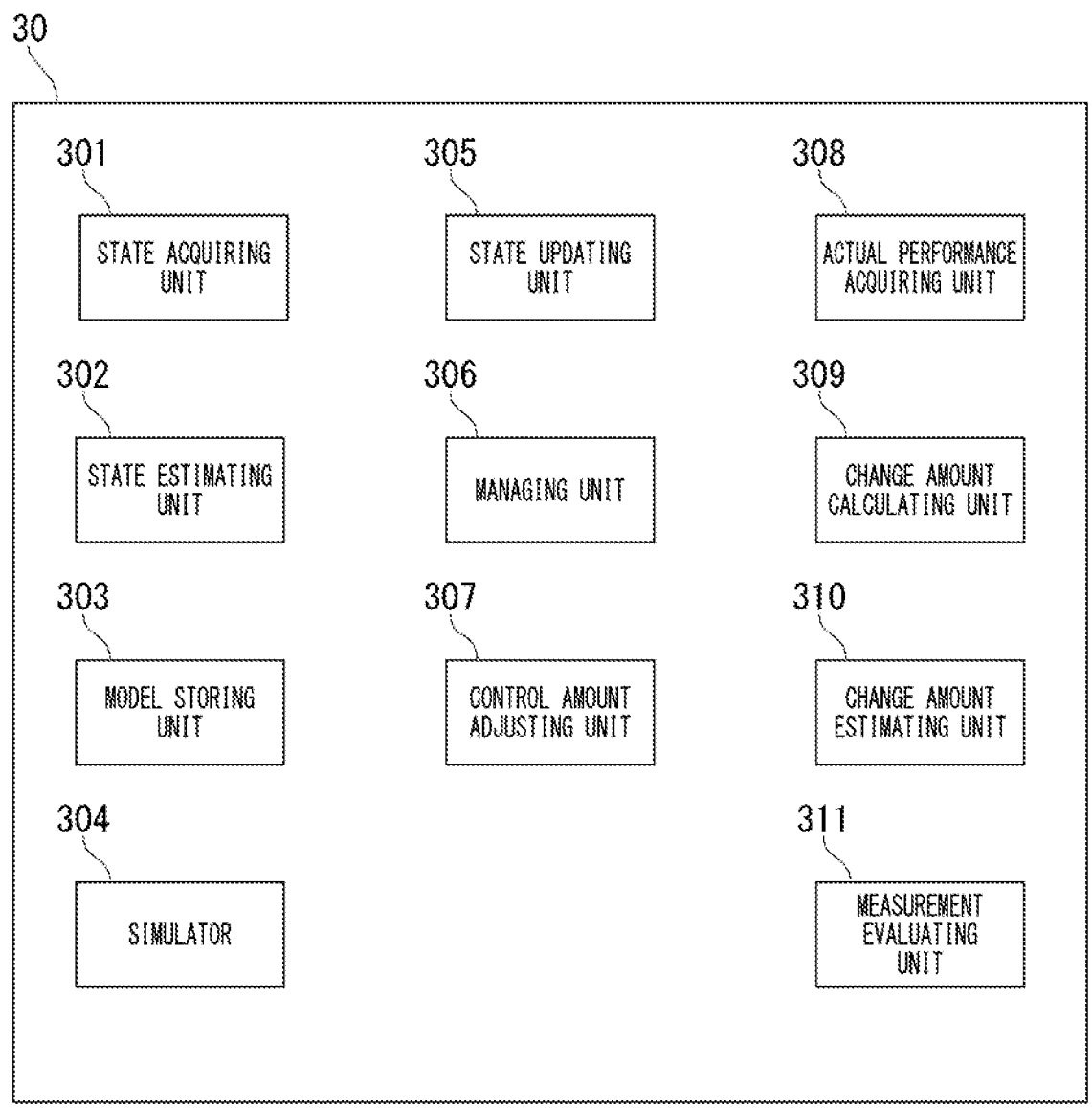
FIG. 10 is a schematic diagram showing a configuration of an operation management device according to the third embodiment.

FIG. 10 is a schematic diagram showing a configuration of the operation management device according to the third embodiment.

The operation management device 30 according to the third embodiment further includes a measurement evaluating unit 311 in addition to the configuration of the second embodiment. The measurement evaluating unit 311 evaluates a measurement value of intake air flow rate with the use of an estimation value of intake air flow rate. Specifically, the measurement evaluating unit 311 performs evaluation on the validity of using a measurement value in managing the power generation plant 1 through determination as to whether or not an error value, which is a difference between a measurement value of intake air flow rate obtained by the intake air flow rate sensor 20f and an estimation value of intake air flow rate obtained by the simulator 304 is equal to or larger than a predetermined threshold. The threshold corresponds to an allowable maximum value of a measurement error (for example, 3σ of a measurement error).

The managing unit 306 according to the third embodiment manages an operation state of the power generation plant 1 based on evaluation results from the measurement evaluating unit 311 indicating whether or not an error value is equal to or larger than the threshold.

<Action of Operation Management Device>

Figure 11:
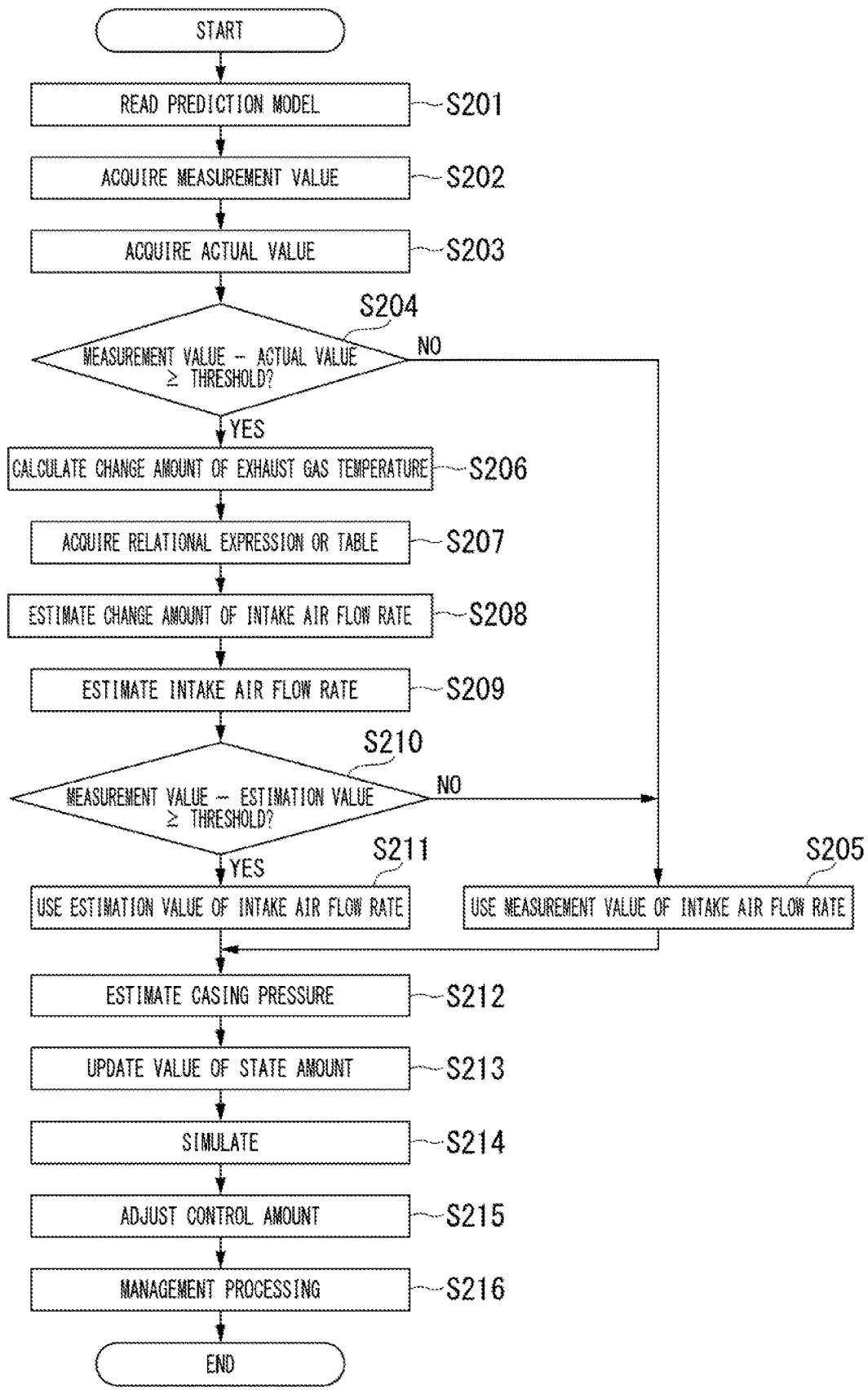
FIG. 11 is a flow chart showing action of the operation management device according to the third embodiment.

FIG. 11 is a flow chart showing action of the operation management device according to the third embodiment.

When the operation management device 30 starts managing the power generation plant 1, the simulator 304 reads the prediction model from the model storing unit 303 (Step S201). Next, the state acquiring unit 301 acquires intake air flow rate, fuel flow rate, nozzle passing flow rate, exhaust gas flow rate, or a manifold pressure from each of the measurement instruments 20 provided in the gas turbine generator 10 (Step S202). Next, the actual performance acquiring unit 308 acquires actual values of intake air flow rate or an exhaust gas temperature from the server device 40 (Step S203).

Next, the measurement evaluating unit 311 determines whether or not a value obtained by subtracting the actual value of the intake air flow rate from the measurement value of the intake air flow rate is equal to or larger than a predetermined threshold (Step S204). In a case where a difference between the measurement value of the intake air flow rate and the actual value of the intake air flow rate is less than the threshold (Step S204: NO), the state updating unit 305 determines to update a value of the intake air flow rate with the measurement value of the intake air flow rate without the state estimating unit 302 performing the estimation of the intake air flow rate (Step S205).

On the other hand, in a case where the difference between the measurement value of the intake air flow rate and the actual value of the intake air flow rate is equal to or larger than the threshold (Step S204: YES), the change amount calculating unit 309 calculates a change amount of an exhaust gas temperature by calculating a difference between a measurement value of the exhaust gas temperature and an actual value of the exhaust gas temperature (Step S206). Next, the change amount estimating unit 310 acquires the relational expression between an exhaust gas temperature and intake air flow rate or the table showing a correspondence relationship between an exhaust gas temperature and intake air flow rate from the server device 40 (Step S207). Next, the change amount estimating unit 310 estimates a change amount of intake air flow rate based on the acquired relational expression or the acquired table (Step S208). Next, the state estimating unit 302 estimates intake air flow rate at the present time point by adding the change amount of the intake air flow rate to the actual value of the intake air flow rate acquired by the actual performance acquiring unit 308 (Step S209).

Next, the measurement evaluating unit 311 determines whether or not an error value, which is a difference between the measurement value of the intake air flow rate and the estimation value of the intake air flow rate is equal to or larger than a predetermined threshold (Step S210). In a case where the error value is less than the threshold (Step S210: NO), the state updating unit 305 determines to update the value of the intake air flow rate with the measurement value of the intake air flow rate (Step S205).

On the other hand, in a case where the error value is equal to or larger than the threshold (Step S210: YES), the state updating unit 305 determines to update the value of the intake air flow rate with the estimation value of the intake air flow rate (Step S211). The threshold can be determined (for example, as 3σ), for example, based on a standard deviation of the value of the intake air flow rate.

When the state updating unit 305 determines whether to use the estimation value or to use the measurement value in updating the value of the intake air flow rate, the state estimating unit 302 estimates a casing pressure based on the fuel flow rate, the nozzle passing flow rate, and the manifold pressure which are acquired by the state acquiring unit 301 (Step S212). A casing pressure estimating method is the same as in the first embodiment. Next, the state updating unit 305 updates a value of a state amount held by the simulator 304 based on a measurement value acquired by the state acquiring unit 301 and an estimation value estimated by the state estimating unit 302 (Step S213). At this time, the state updating unit 305 updates the value of the intake air flow rate with the value determined in Step S205 or S211. Then, the simulator 304 simulates the power generation plant 1 based on the prediction model and the updated value of the state amount (Step S214).

The control amount adjusting unit 307 adjusts a control amount of the power generation plant 1 based on the simulation results from the simulator 304 (Step S215). Next, the managing unit 306 performs management processing of the power generation plant 1 based on the simulation results from the simulator 304 and the control amount adjusted by the control amount adjusting unit 307 (Step S216). After then, the operation management device 30 brings the processing back to Step S2, and executes calculation related to the next control timing.

As described above, in the third embodiment, the operation management device 30 performs evaluation of a measurement value of the second state amount based on an estimation value of the second state amount. Accordingly, in a case where it can be determined that the reliability of the measurement value of the second state amount is sufficiently high based on the estimation value, the management of the power generation plant 1 is performed with the use of the measurement value. Consequently, the operation management device 30 can manage an operation state of the power generation plant 1 based on the measurement value while ensuring the reliability. Although the operation management device 30 according to the third embodiment determines whether to update a value of the second state amount with the use of a measurement value or to update the value of the second state amount with the use of an estimation value based on an estimation value of the second state amount, the present invention is not limited thereto. For example, in other embodiments, the operation management device 30 may acquire a weighted average of an estimation value and a measurement value with weighting based on evaluation results of a measurement value, or may update a value of the second state amount with the use of both of an estimation value and a measurement value without performing evaluation of a measurement value.

In addition, in other embodiments, the operation management device 30 may estimate the third state amount based on a measurement value of the first state amount or an estimation value of the second state amount, or may evaluate the third state amount calculated by the simulator 304 with the use of the estimation results.

Although one embodiment has been described in detail with reference to the drawings hereinbefore, specific configurations are not limited to the description above, and it is possible to make various design changes.

For example, in other embodiments, part of processing of the operation management device 30 described above may be executed by other devices (for example, the server device 40). In this case, a combination of the operation management device 30 and the server device 40 can be regarded as an operation management device. In addition, in other embodiments, the operation management device 30 may have some or all of functions of the server device 40.

<Computer Configuration>

Figure 12:
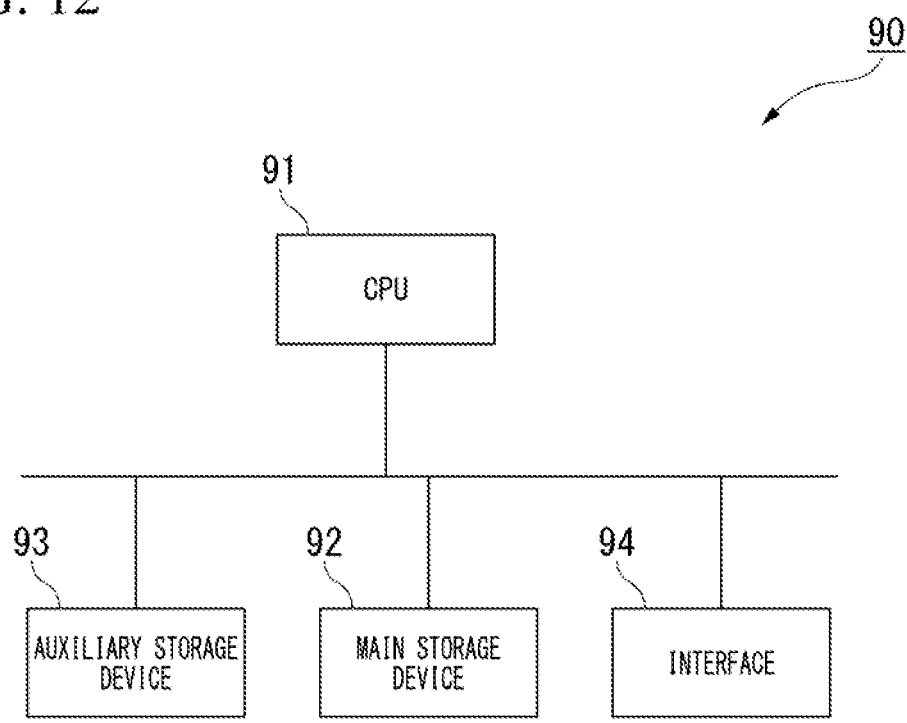
FIG. 12 is a functional block diagram showing a configuration of a computer according to at least one embodiment.

FIG. 12 is a functional block diagram showing a configuration of a computer according to at least one embodiment.

A computer 90 includes a CPU 91, a main storage device 92, an auxiliary storage device 93, and an interface 94.

The operation management device 30 described above is mounted on the computer 90. Action of each processing unit described above is stored in the auxiliary storage device 93 in the form of a program. The CPU 91 reads the program from the auxiliary storage device 93, develops the program in the main storage device 92, and executes the processing in accordance with the program. In addition, the CPU 91 secures a storage area corresponding to each storage unit described above in the main storage device 92 in accordance with the program.

Examples of the auxiliary storage device 93 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The auxiliary storage device 93 may be an internal medium directly connected to a bus of the computer 90, or may be an external medium connected to the computer 90 via the interface 94 or a communication line. In addition, in a case where the program is delivered to the computer 90 through the communication line, the computer 90 which has received the delivery may develop the program in the main storage device 92, and execute the processing. In at least one embodiment, the auxiliary storage device 93 is a tangible storage medium which is not temporary.

In addition, the program may be a program for realizing some of the functions described above. The program may be a so-called differential file (differential program) that is realized in combination with other programs in which the functions described above are already stored in the auxiliary storage device 93.

INDUSTRIAL APPLICABILITY

The operation management device according to the present invention can appropriately manage an operation state of a facility.

REFERENCE SIGNS LIST

1: power generation plant
10: gas turbine generator
20: measurement instrument
30: operation management device
301: state acquiring unit
302: state estimating unit
303: model storing unit
304: simulator
305: state updating unit
306: managing unit
307: control amount adjusting unit

The invention claimed is:

1. An operation management device comprising:
   a state acquiring unit that acquires a measurement value of a first state amount indicating an operation state of a power generation plant;
   an actual performance acquiring unit that acquires an actual value of the first state amount and an actual value of the second state amount of which a measurement value obtained by measurement has reliability lower than reliability of the measurement value of the first state amount, which are related to past operation of the power generation plant or another power generation plant different from the power generation plant;
   a change amount calculating unit that calculates a first change amount which is a difference between the actual value of the first state amount and the measurement value of the first state amount; and
   a change amount estimating unit that estimates a second change amount which is a change amount from the actual value of the second state amount related to the past operation of the power generation plant or the other power generation plant based on the first change amount;
   a state updating unit that updates an estimation value of the second state amount based on the second change amount and the actual value of the second state amount; and
   a managing unit that manage the operation state of the power generation plant based on the estimation value of the second state amount.

2. The operation management device according to claim 1,
   wherein the state acquiring unit further acquires a measurement value of the second state amount, and
   the managing unit manages the operation state of the power generation plant based on the measurement value of the second state amount.

3. The operation management device according to claim 1, further comprising:
   a measurement evaluating unit that evaluates a measurement value of the second state amount based on the estimation value of the second state amount,
   wherein the managing unit manages the operation state of the power generation plant based on an evaluation result of the measurement value.

4. The operation management device according to claim 3,
   wherein the measurement evaluating unit evaluates the measurement value of the second state amount by calculating an error value which is a difference between the estimation value of the second state amount and the measurement value of the second state amount, and
   the managing unit manages the operation state of the power generation plant based on the error value of the second state amount.

5. The operation management device according to claim 1,
   wherein the change amount estimating unit estimates the second change amount based on any one of a relational expression between the first change amount and the second change amount, a table showing a correspondence relationship between the first change amount and the second change amount, and any input value.

6. The operation management device according to claim 1,
   wherein the first state amount includes an exhaust gas temperature, and
   the second state amount includes intake air flow rate.

7. The operation management device according to claim 1,
   wherein the managing unit manages the operation state of the power generation plant based on an estimation value of a third state amount which is a state amount different from the first state amount and the second state amount indicating the operation state of the power generation plant.

8. The operation management device according to claim 7,
   wherein the third state amount includes a combustion temperature.

9. A power generation plant comprising the operation management device according to claim 1.

10. An operation management method for a power generation plant, the method comprising the steps of:
    acquiring measurement values of a first state amount indicating an operation state of the power generation plant or another power generation plant different from the power generation plant, and a second state amount of which a measurement value has reliability lower that the reliability of the first state amount;
    acquiring an actual value of the first state amount and an actual value of the second state amount;
    calculating a first change amount which is a difference between the actual value of the first state amount and the measurement value of the first state amount;
    estimating a second change amount which is a change amount from the actual value of the second state amount related to the past operation of the power generation plant or the other power generation plant based on the first change amount;
    adding the second change amount to the actual value of the second state amount, thereby estimating a second change amount at present time point;
    estimating the second change amount based on the acquired measurement values of the first state amount;
    updating an estimation value of the second state amount based on the second change amount and the actual value of the second state amount;
    determining the state of the power plant based on the measurement value of the second state amount, and inputting the measurement value of the first state amount into a function in which the second state amount is estimated based on the first state amount, the function being defined for each state of the power generation plant, thereby updating an estimation value of the second state amount based on the measurement value of the first state amount, the second state amount indicating the operation state of the power generation plant, being a state amount different from the first state amount, and being a state amount of which a measurement value obtained by measurement has reliability lower than reliability of the measurement value of the first state amount; and
    managing the operation state of the power generation plant based on the estimation value of the second state amount.

11. The operation management device according to claim 1,
    wherein the state acquiring unit further acquires a measurement value of the second state amount, and
    the managing unit manages the operation state of the power generation plant based on the measurement value of the second state amount.

* * * * *